US 8,166,896 B2

(12) United States Patent
Shoup

(10) Patent No.: US 8,166,896 B2
(45) Date of Patent: May 1, 2012

(54) LOW FRICTION SEED METER

(75) Inventor: Kenneth E. Shoup, Bonfield, IL (US)

(73) Assignee: Kinze Manufacturing, Inc., Williamsburg, IA (US)

( * ) Notice: Subject to any disclaimer, the term of this patent is extended or adjusted under 35 U.S.C. 154(b) by 0 days.

(21) Appl. No.: 13/053,635

(22) Filed: Mar. 22, 2011

(65) Prior Publication Data

US 2011/0226168 A1    Sep. 22, 2011

Related U.S. Application Data

(60) Provisional application No. 61/316,239, filed on Mar. 22, 2010.

(51) Int. Cl.
*A01C 7/00* (2006.01)
*A01C 9/00* (2006.01)

(52) U.S. Cl. ..................................... 111/185

(58) Field of Classification Search ............... 111/174, 111/177–180, 182–185; 221/185, 251, 263; 222/394, 410, 414
See application file for complete search history.

(56) References Cited

U.S. PATENT DOCUMENTS

| 5,392,707 | A | 2/1995 | Romans |
| 5,740,747 | A | 4/1998 | Stufflebeam et al. |
| 6,718,892 | B1 | 4/2004 | Rosenboom |
| 7,451,713 | B2 | 11/2008 | Mariman et al. |
| 2005/0204972 | A1 | 9/2005 | Eben et al. |

OTHER PUBLICATIONS

International Search Report and Written Opinion dated May 20, 2011 for corresponding PCT Patent Application No. PCT/US2011/029399.

*Primary Examiner* — Christopher J. Novosad
(74) *Attorney, Agent, or Firm* — Edwards Wildman Palmer LLP

(57) ABSTRACT

The seed meter includes the combination of a vacuum housing and a seed disc coupled together in a sealed manner to form a vacuum chamber. Disposed within the vacuum chamber is a generally flat finger wheel having plural radially extending resilient fingers. Also disposed in the vacuum chamber is a fixed arm. A seed hopper is disposed adjacent the seed disc for providing seeds to an outer surface of the seed disc, with the seeds adhering to the plural spaced apertures on the seed disc's periphery with vacuum applied to the disc's inner surface. A rotary drive spindle rotates the vacuum housing, seed disc and finger wheel combination, with each resilient finger sequentially deflected by the fixed arm to sequentially engage each disc aperture, interrupting vacuum communication with each aperture, for sequentially releasing the seeds.

15 Claims, 4 Drawing Sheets

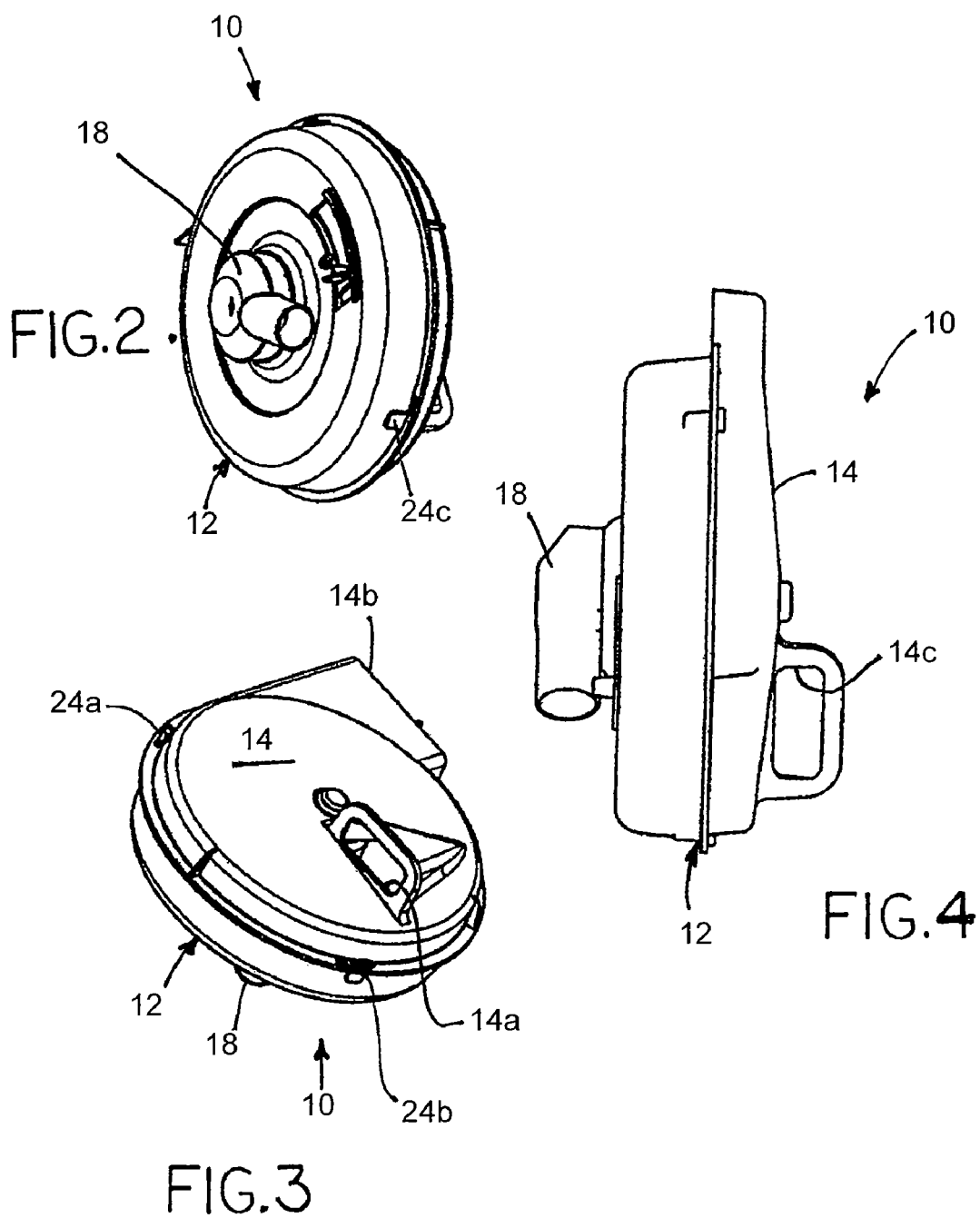

LOW FRICTION SEED METER

RELATED APPLICATIONS

The present application claims the benefit of U.S. Provisional Patent Application No. 61/316,239, filed Mar. 22, 2010, the entire contents of which are incorporated herein by reference.

FIELD OF THE INVENTION

This invention relates generally to agricultural seed meters of the type having a rotating disc with peripheral spaced apertures to which seeds adhere by means of an applied vacuum and are released in a timed manner, and is particularly directed to an agricultural seed meter wherein the vacuum chamber rotates with the seed disc.

BACKGROUND OF THE INVENTION

Vacuum seed meters are commonly used in agricultural planters in the planting of crops. The typical vacuum seed meter includes a rotating seed disc having plural spaced apertures about its periphery. Each aperture is adapted to receive an individual seed which is maintained in position in the aperture on a first side of the seed disc by means of a vacuum applied to a second, opposed sided of the disc. Each seed is sequentially released from its aperture in the seed disc by interrupting the applied vacuum, allowing the seed to drop to the soil under the influence of gravity.

Vacuum seed meters have, to varying degrees, various operating limitations because of their design and the environment in which they operate. For example, a high vacuum must be maintained across the seed disc to securely maintain the seeds in position on the seed disc until they are released. The applied vacuum must be interrupted completely and very abruptly to allow for the consistent and accurate release of the individual seeds to ensure proper seed positioning and inter-seed spacing. Irregularities in seed position and inter-seed spacing result in poor plant development and reduced crop production. Failure to maintain a vacuum seal in the seed meter results in variations in the applied vacuum and introduction of crop residue or various other unwanted remnants, any of which can cause irregular and inconsistent seed meter performance, and damage to or failure of the seed meter. Maintaining a high vacuum requires fixed seals between adjacent stationary components and intimate contact between adjacent moving components. Intimate contact between moving parts gives rise to component wear, formation of gaps between these moving parts over time, and a consequent reduction in the performance of the seed meter. In addition, frictional losses in many existing vacuum seed meters imposes substantially increased loads on the source of power for these types of agricultural implements, i.e., the tractor.

OBJECTS AND SUMMARY OF THE INVENTION

Accordingly, it is an object of the present invention to provide for more accurate placement of seeds in the soil during planting.

It is another object of the present invention to reduce the amount of energy required to drive plural vacuum seed meters incorporated in an agricultural planter and used in the planting of seeds in the soil.

It is a further object of the present invention to provide a vacuum seed meter used in the planting of crops which is capable of maintaining and precisely controlling a high vacuum to provide highly consistent and accurate release of seeds from the meter, as well as the trajectory of the seed following the release for more accurate positioning of the seeds in the soil.

Still another object of the present invention is to prevent field residue from interfering with the positioning of seeds on, and the release of seeds from, the seed disc of a vacuum seed meter in an agricultural planter.

These and other objects are achieved by the present invention. In some exemplary aspects of the present invention, a vacuum seed meter is provided and may include a bowl-shaped vacuum chamber with a generally flat closed end portion with an aperture coupled to a vacuum line via a rotary coupling. Disposed within the vacuum chamber and coupled to the vacuum line in a fixed manner and extending radially outward from a central rotational axis of the vacuum chamber is a stationary arm having a cam follower with a plurality of inline rollers disposed on its distal end. In some aspects, the cam follower may include four inline rollers. Attached to the open end of the vacuum chamber opposite the vacuum line coupling in a sealed manner is the aligned, closely spaced combination of an outer seed disc having plural peripheral spaced seed-receiving apertures and an inner vacuum release disc having plural spaced radially extending, flexible fingers each having a seed aperture engaging member on its distal end and a cam following member disposed at an intermediate location on the finger along its length. Rotation of the vacuum chamber and the combination of the seed disc and vacuum release disc causes the cam follower on the distal end of the stationary arm to sequentially engage each flexible finger of the rotating vacuum release disc. This causes the sequential deflection of each of the fingers with the seed aperture engaging members disposed on the distal ends of the fingers sequentially covering and interrupting vacuum communication with a seed-bearing aperture, which, in turn, sequentially releases the seeds disposed in the seed disc's peripheral apertures for discharge in the soil. The cam follower on the distal end of the stationary arm within the vacuum chamber includes plural inline engaging members, which in one exemplary embodiment include a plurality of roller bearings, each positioned over one or more flexible fingers proximate to consecutive seed-bearing apertures for removing the vacuum and allowing the sequential release of the seeds disposed over those apertures. In some aspects, the cam follower may include four roller bearings to allow the sequential release of four seeds disposed over four apertures. The simultaneous vacuum cutoff of more than one seed aperture provides sufficient dwell time for the complete release of the seeds and their unobstructed separation from the seed disc, which is sequentially repeated for the additional approaching seeds. The point of release for the seeds may be adjusted by angularly changing the radial position relative to the axis of rotation of the cam bearing arm within the vacuum chamber. Each seed aperture engaging member is preferably in the form of a generally flat disc formed of a compressible material and includes a small projection for engaging and discharging from the seed disc aperture any debris remaining in the aperture following discharge of a seed therefrom.

BRIEF DESCRIPTION OF THE DRAWINGS

The appended claims set forth those novel features which characterize the invention. However, the invention itself, as well as further objects and advantages thereof, will best be understood by reference to the following detailed description of an exemplary embodiment, taken in conjunction with the accompanying drawings, where like reference characters identify the elements throughout the various figures in which:

FIG. 2 is a perspective view of the inventive low friction seed meter showing the outer cover portion of the seed meter's housing;

FIG. 3 is a perspective view of the inventive low friction seed meter showing the seed hopper side of the meter;

FIG. 4 is an end-on lateral view of the inventive low friction seed meter;

DETAILED DESCRIPTION OF THE PREFERRED EMBODIMENTS

Figure 1:
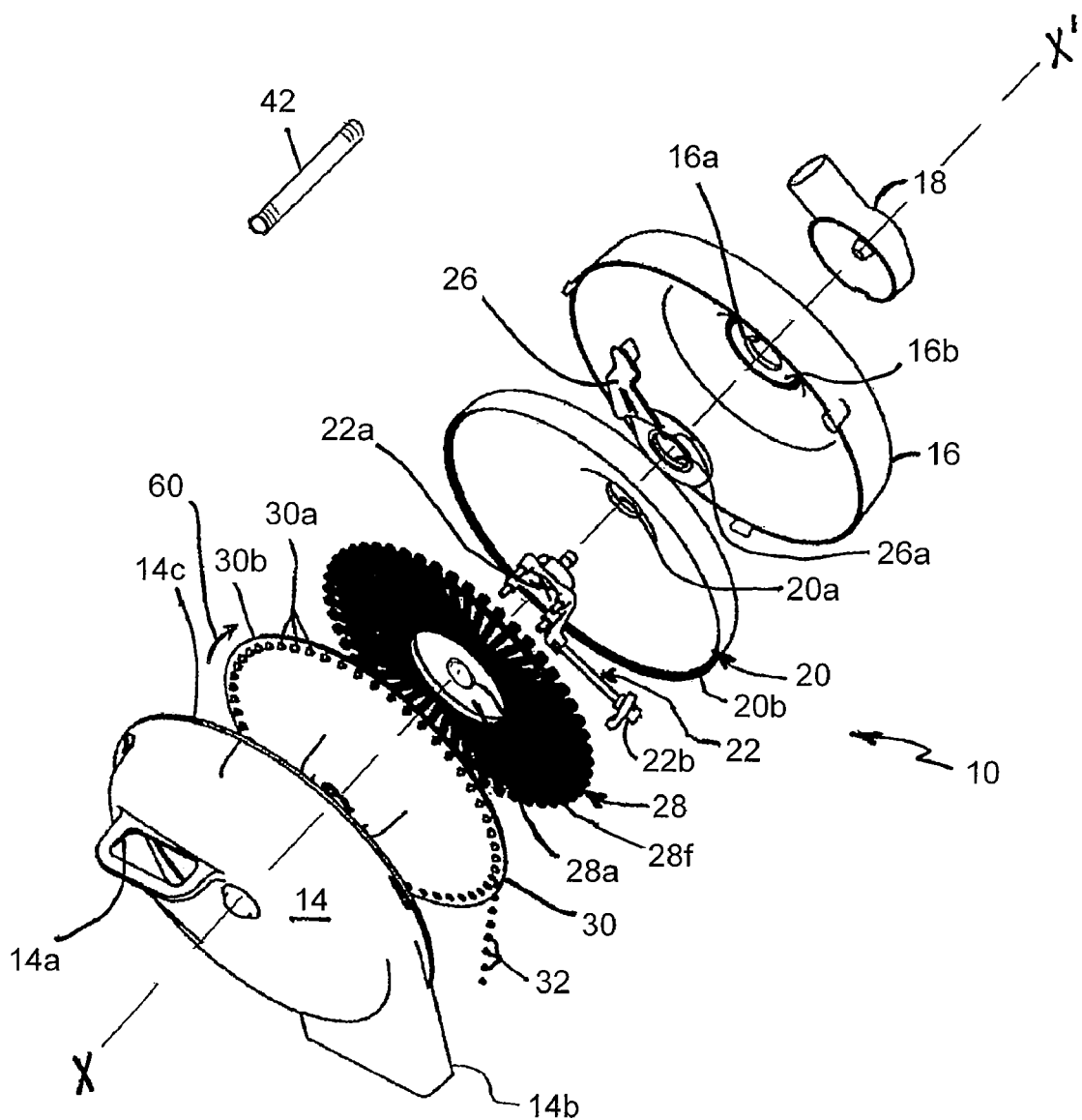
FIG. 1 is an explored perspective view of a low friction seed meter in accordance with the principles of the present invention.

Referring to FIG. 1, there is shown an exploded perspective view of a low friction seed meter 10 in accordance with the principles of the present invention. Low friction seed meter 10 includes an outer, closed housing 12 comprised of a seed hopper 14 and an outer cover 16. First and second perspective views of the closed housing 12 are shown in FIGS. 2 and 3, while a side elevation view of the closed housing is shown in FIG. 4.

Seed hopper 14 and outer cover 16 are securely coupled together by means of plural connecting clips, three of which are shown as elements 24a, 24b and 24c in FIGS. 2 and 3. A closed end of the outer cover 16 includes a center aperture 16a. The outer surface of outer cover 16 is adapted for attachment to a vacuum inlet 18 by means of a rotary seal 16b disposed about the aperture 16a in the outer cover. Rotary seal 16b provides a vacuum-tight seal between outer cover 16 and vacuum inlet 18, which is connected to a conventional vacuum source (which is not shown in the figures for simplicity).

Disposed in outer cover 16 is a rotating vacuum chamber 20 having a center aperture 20a therein. Disposed between and positioned in contact with the outer cover 16 and rotating vacuum chamber 20, and aligned with the respective apertures 16a and 20a therein, is a rotary vacuum coupling 26 having an aperture 26a therein. Rotary vacuum coupling 26 functions as a slip joint, permitting rotational displacement between outer cover 16 and vacuum chamber 20 while maintaining a vacuum seal therebetween.

Disposed within rotating vacuum chamber 20 and extending through the aperture 20 therein is a central vacuum sealed inlet 22a of a fixed, or stationary, arm 22. Central vacuum sealed inlet 22a is coupled in a sealed manner to vacuum inlet 18. A vacuum is produced in vacuum chamber 20 by the fixed arm's central vacuum sealed inlet 22a which is coupled to a vacuum source via the vacuum inlet 18. Disposed on the distal end of fixed arm 22 is a cam follower 22b with roller bearings which is described in detail below.

Figure 8:
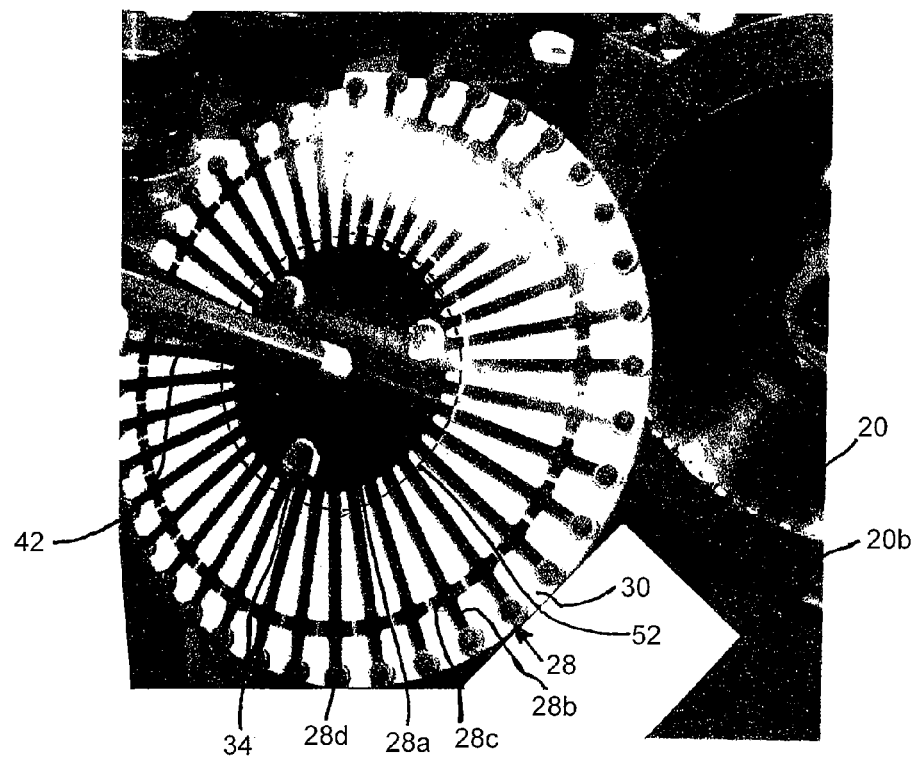
FIG. 8 is a perspective view of the combination of the inventive low friction seed meter's seed disc, finger wheel, seed hopper and rotary drive spindle.

Extending through aligned apertures 16a, 26a, 20a and an aperture in the central vacuum sealed inlet 22a of fixed arm 22 is a rotary drive spindle 42. One end of the rotary drive spindle 42 passes through the vacuum inlet 18, in a sealed manner, while a second, opposed end of the rotary drive spindle is coupled to a rotary bearing attached to an inner portion of a seed hopper 14 and aligned along a rotational axis X-X' of seed meter 10. Finger wheel 28 and seed disc 30 are disposed within rotating vacuum chamber 20 and are positioned in closely spaced relation to one another as shown in FIG. 8. Finger wheel 28 includes a center hub 28a coupled by means of plural coupling bolts 34 to a center portion of seed disc 30. Radially extending outwardly from the finger wheel's generally circular hub 28a are plural spaced, flexible, radial fingers 28b. In the illustrated exemplary embodiment, the hub 28a and radial fingers 28b of finger wheel 28 are unitarily formed as a single metal structure as shown in FIG. 8. In other exemplary embodiments, the hub 28a and radial fingers 28b may be formed separately and coupled together in a variety of different manners including, for example, bonding, welding, adhering, fastening, or any other manner, all of which are intended to be within the intended spirit and scope of the present invention. Vacuum chamber 20, finger wheel 28 and seed disc 30 are securely coupled to rotary drive spindle 42. Drive spindle 42 is coupled to a source of rotary motion so as to rotationally displace vacuum chamber 20 and the combination of finger wheel 28 and seed disc 30. Rotary vacuum coupling 26 serves as a sealed slip joint allowing fixed arm 22 to be attached to the rotary drive spindle 42 while remaining in fixed position within rotating vacuum chamber 20. The peripheral edge portion 30b of seed disc 30 is disposed within, but does not contact, an outer, circular, peripheral edge portion 14c of the seed hopper 14. Seed hopper 14 is adapted to receive seeds via an seed inlet portion 14a, with the seeds discharged from its seed discharge portion 14b as described below.

As described above, the inner hub 28a of finger wheel 28 is securely connected to a center portion of seed disc 30. Disposed about the outer peripheral portion of seed disc 30 in a spaced manner are plural apertures 30a each adapted to receive and hold a seed as described below. Each of the flexible radial fingers 28b is adapted for deflecting generally perpendicular to the plane of the finger wheel's central hub 28a. Each of the flexible radial fingers 28b includes on its distal end a respective vacuum cutoff member 28d. Each of the vacuum cutoff members 28d is aligned with a respective seed receiving aperture 30a in seed disc 30. Each of the flexible radial fingers 28b further includes a cam follower wing 28c on an intermediate portion of the finger between its proximal and distal ends.

Figure 5:
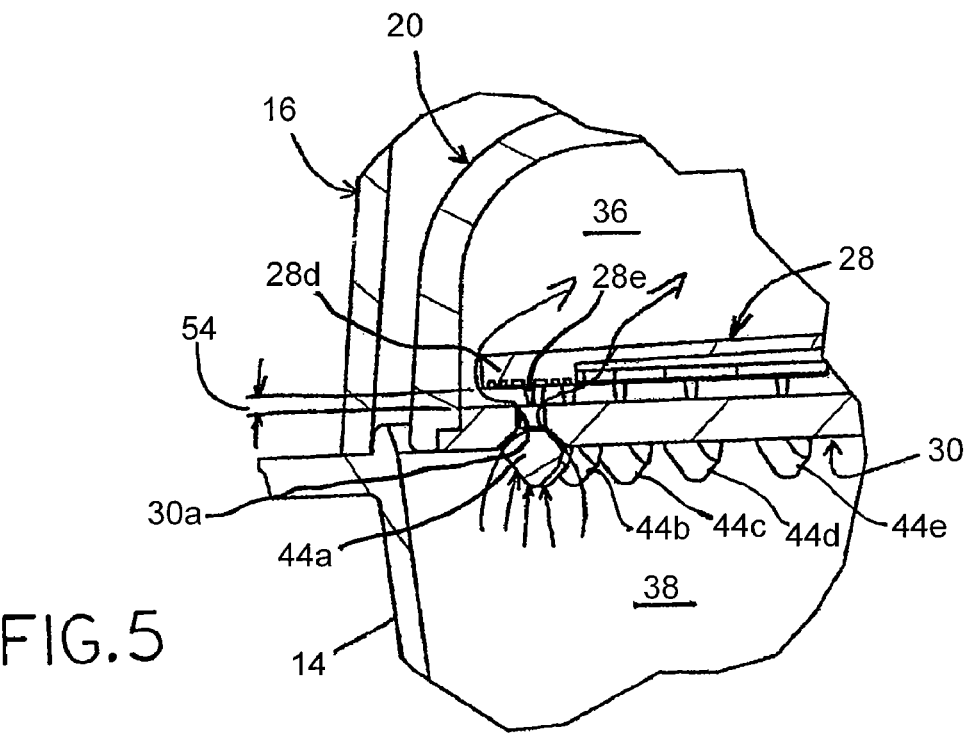
FIG. 5 is a sectional view of the inventive low friction seed meter taken along site line 5-5 in FIG. 7.

The low friction seed meter 10 operates in the following manner. A vacuum is created within the closed structure formed by the rotating vacuum chamber 20 and seed disc 30. A vacuum seal is provided between the outer periphery of seed disc 30 and the peripheral edge 20b of the rotating vacuum chamber 20. The vacuum chamber 20, finger wheel 28 and seed disc 30 are coupled to and rotated by means of the rotating drive spindle 42. Seeds disposed within seed hopper 14 are drawn by vacuum to a position over each of the peripheral apertures 30a within the seed disc 30. With seeds disposed over each of the peripheral apertures 30a on the surface of the seed disc 30 which is visible in FIG. 1, the seeds are displaced clockwise in the direction of arrow 60 about the axis of rotation X-X'. Thus, as seen in FIG. 5, which is a sectional view taken along site line 5-5 in FIG. 7, adjacent peripheral portions of finger wheel 28 and seed disc 30 are disposed in closely spaced relation between seed hopper 14 and rotating vacuum chamber 20. Outer cover 16 is shown disposed outward from and about the rotating vacuum chamber 20. The low pressure side 36 of the combination of finger wheel 28 and seed disc 30 is disposed above this combination as shown in FIG. 5, while the high pressure side 38 (at atmospheric pressure) is shown in the figure as disposed below the combination of the finger wheel and seed disc. The arrows in FIG. 5 illustrate the direction of air flow as upward in the figure into the rotary vacuum chamber 20 to the low pressure side 36 of the finger wheel-seed disc combination. The difference in pressure between the two sides of the finger wheel-seed disc combination causes seeds 44a to become held in place over the peripheral apertures 38a of seed disc 30. Additional seeds 44b-44e held in place over other seed receiving apertures in seed disc 30, which apertures are not shown in FIG. 5 for simplicity, are also shown in the figure. As further shown in FIG. 5, a gap, or space, 54 is present between the facing portions of finger wheel 28 and seed disc 30 to allow vacuum to be drawn through aperture 30a for positioning and retaining seed 44a within aperture 30a, as well as allowing other seeds to be positioned in other, adjacent seed disc apertures.

Figure 6:
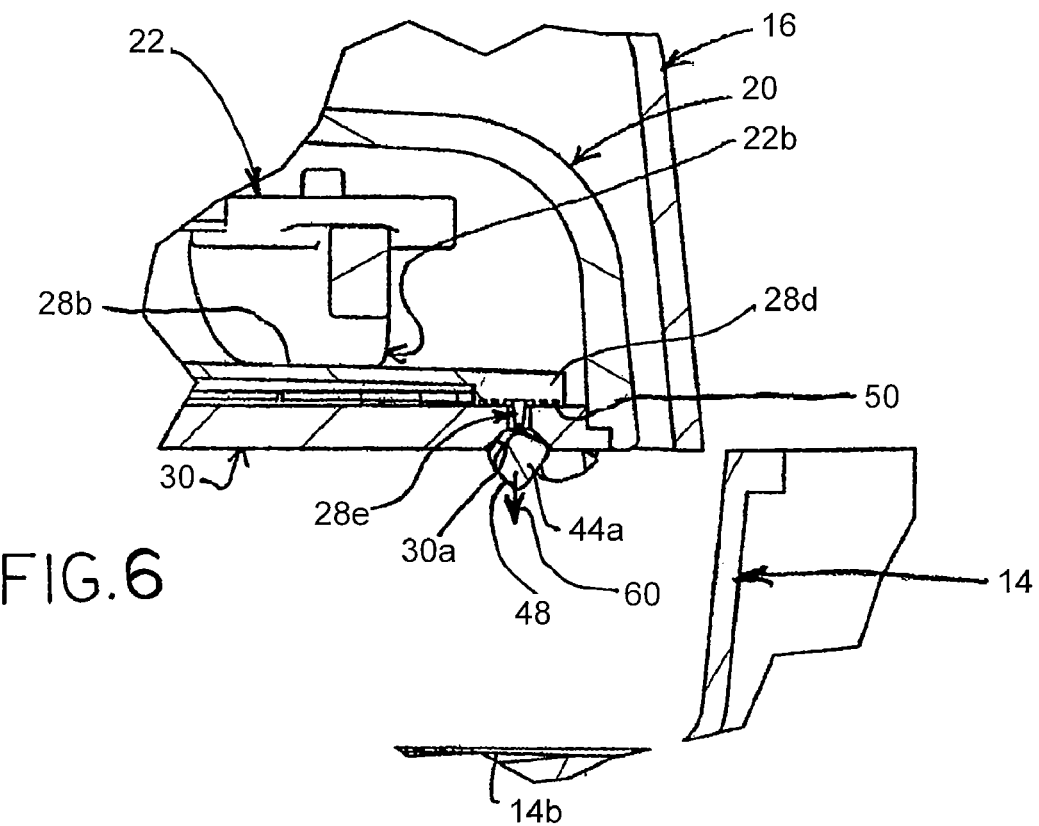
FIG. 6 is a sectional view of the inventive low friction seed meter taken along site line 6-6 in FIG. 7.
Figure 7:
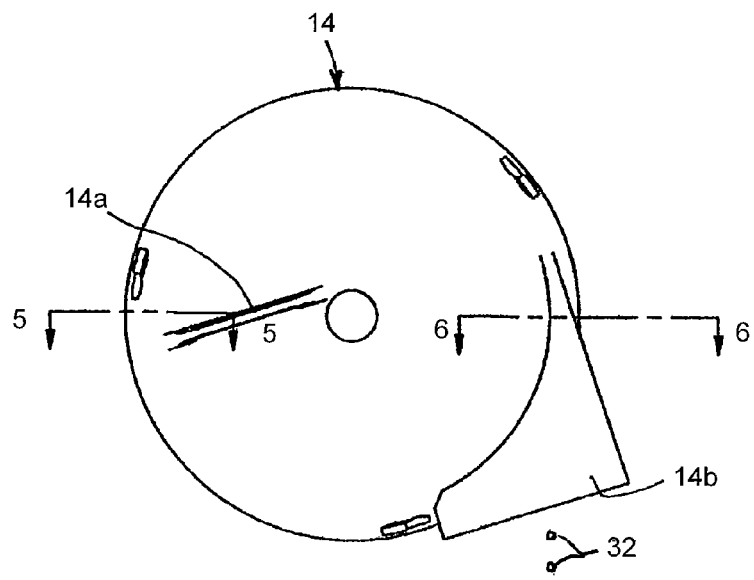
FIG. 7 is a lateral view of the inventive low friction seed meter illustrating details of its seed hopper.

As seed disc 30 rotates clockwise in the direction of arrow 60 as shown in FIG. 1, each flexible radial finger 28b will become positioned adjacent to and be engaged in a sequential manner by the cam follower 22b (see FIG. 6) disposed on the distal end of fixed arm 22. Cam follower 22b sequentially engages the cam follower wing 28c of each of the flexible radial fingers 28b during rotational displacement of the finger wheel-seed disc combination. When cam follower 22b engages a cam follower wing 28c of a flexible radial finger 28b, the distal end of flexible radial finger 28b is deflected toward seed disc 30 so that a vacuum cutoff member 28d disposed on the radial finger's distal end engages the facing surface of seed disc 30 as shown in the sectional view of FIG. 6. With the vacuum cutoff member 28b engaging the seed disc 30 at a location over a peripheral aperture 38a in the seed disc so as to cut off the vacuum from the aperture, seed 44a is released under the influence of gravity in the direction of arrow 60 as shown in FIG. 6. This allows for the sequential discharge of seeds 32 from the seed discharge portion 14b of seed hopper 14 as shown in FIG. 7.

The width of cam follower 22b disposed on the distal end of fixed arm 22 is such that it simultaneously engages plural cam follower wings 28c on adjacent radial fingers 28b during rotation of the seed disc 30. In the illustrated exemplary embodiment, cam follower 22b includes four spaced roller bearings aligned along the direction of travel of the cam follower, with each roller bearing engaging a respective radial finger 28b so as to sequentially release the seeds disposed in the covered apertures. The spacing between adjacent rollers of cam follower 22b is such that four adjacent seed-bearing apertures are simultaneously covered and each aperture remains covered long enough to ensure complete release of the seed from the seed disc 30. This provides sufficient dwell time for complete release and sufficient separation of each seed from the seed disc 30 so that the seed's trajectory is consistent and not affected by the applied vacuum. This ensures accurate placement of the seeds in the soil. The location within seed hopper 14 of the release of seeds from the rotating seed disc 30 may be precisely adjusted by rotation of the fixed arm 22 about the seed meter's axis of rotation X-X'. Thus, the release of seeds from the seed disc 30 may be advanced or retarded by selective rotation of fixed arm 22.

Attached to and extending outward from the vacuum cutoff member 28d on the distal end of each of the flexible radial fingers 28b is an aperture clearing member 28e as shown in FIGS. 5 and 6. Aperture clearing member 28e, which preferably is in the form of a thin wire, extends into a peripheral aperture 30a of seed disc 30 after the cutoff of vacuum and the release of seed 44a. Aperture clearing member 28e functions to clear, or discharge from, the aperture 30a debris to facilitate adherence of another seed following application of vacuum again through the aperture. As shown in FIGS. 5 and 6, the lower portion of aperture 38a is enlarged to facilitate receipt and positioning of a seed 44a on the surface of the seed disc and over the aperture 30a therein. Also as shown in FIG. 8, there is a disc-shaped spacer 52 disposed between seed disc 30 and the finger wheel's hub 28a and adjacent an inner end of each of the flexible radial fingers 28b. Spacer 52 ensures proper spacing between the vacuum cutoff members 28d on the distal end of each of the flexible radial fingers 28b and the adjacent surface of the seed disc 30 to allow for application of vacuum to each of the apertures to ensure secure attachment of the seeds to the seed disc.

While particular embodiments of the present invention have been illustrated and described, it will be obvious to those skilled in the relevant arts that changes and modifications may be made without departing from the invention in its broader aspects. Therefore, the aim in the appended claims is to cover all such changes and modifications that fall within the true spirit and scope of the invention. The matters set forth in the foregoing description and accompanying drawings is offered by way of illustration only and not as a limitation. The actual scope of the invention is intended to be defined in the following claims when viewed in their proper perspective based on the prior art.

I claim:
1. A seed meter comprising:
a generally circular vacuum housing coupled to a vacuum source;
a generally circular seed disc having first and second opposed surfaces and plural spaced apertures disposed adjacent to and about its outer periphery, each aperture adapted to receive a seed, wherein said seed disc is attached about its outer periphery in a sealed manner to said vacuum housing so as to define a vacuum chamber adjacent the first surface of said seed disc;
a generally flat finger wheel disposed in said vacuum chamber intermediate said vacuum housing and said seed disc, and in facing relation to the first surface of said seed disc, said finger wheel including plural radially extending, spaced, resilient fingers each adapted for deflecting in a direction along an axis extending through aligned centers of said vacuum chamber, seed disc and finger wheel, each of said resilient fingers including a respective distal end portion;
a seed hopper disposed adjacent said seed disc for providing seeds to the second surface of said seed disc, wherein the vacuum formed on the first surface of said seed disc causes seeds to adhere to the second surface of said seed disc over the peripheral apertures of said seed disc, said seed hopper including a seed discharge portion;
a spindle connected to a rotary drive source and to said vacuum housing, seed disc and finger wheel for rotationally displacing said vacuum housing, seed disc and finger wheel about said axis in unison;
a fixed member disposed in said vacuum chamber adjacent said finger wheel for sequentially deflecting each resilient finger of said rotating finger wheel toward said seed disc, wherein the distal end portion of each resilient finger is sequentially positioned into engagement with an aperture on the first surface of said rotating seed disc at a designated location thereby interrupting vacuum communication with said peripheral aperture and releasing a seed positioned thereon at said designated location, and wherein said designated location is aligned with the seed discharge portion of said seed hopper.

2. The seed meter of claim 1 further comprising a fixed outer cover disposed adjacent said vacuum housing and coupled to said seed hopper and enclosing said vacuum housing, seed disc and finger wheel.

3. The seed meter of claim 2 further comprising a rotary vacuum coupling disposed intermediate and coupled in a sealed manner to said rotating vacuum housing and to said fixed outer cover for rotationally coupling said vacuum housing and said outer cover.

4. The seed meter of claim 3, wherein said fixed outer cover includes a rotary seal, said seed meter further comprising a vacuum inlet coupled to an outer portion of said fixed outer cover by means of said rotary seal and further coupled to the vacuum source.

5. The seed meter of claim 1, wherein said fixed member is an elongated arm further including an inner proximal end portion coupled in a rotating, sealed manner to an inner portion of said vacuum housing along said axis, and having a distal end portion for engaging and sequentially deflecting each resilient finger of said rotating finger wheel.

6. The seed meter of claim 5, wherein the distal end portion of said fixed elongated arm includes a cam follower for sequentially engaging an intermediate portion of each resilient finger and deflecting said resilient finger toward and into engagement with said rotating seed disc over a peripheral aperture therein.

7. The seed meter of claim 6, wherein each resilient finger includes a cam follower wing disposed on an intermediate portion of the resilient finger and adapted for sequential engagement with the cam follower of said fixed member during rotation of said finger wheel.

8. The seed meter of claim 7, wherein the distal end portion of each resilient finger includes an upraised vacuum cutoff member adapted for positioning over an adjacent peripheral aperture in said seed disc upon deflection of an associated resilient finger toward said seed disc by said fixed member.

9. The seed meter of claim 8, wherein said vacuum cutoff member includes an aperture clearing member adapted for insertion through a peripheral aperture in said seed disc when said vacuum cutoff member is disposed over said aperture and in contact with the first surface of said seed disc for clearing debris from said aperture to facilitate adherence of another seed to said aperture following application of vacuum again through said aperture.

10. The seed disc of claim 1, wherein said fixed member simultaneously engages and deflects plural adjacent resilient fingers into engagement with said seed disc to interrupt vacuum communication with plural adjacent apertures to ensure complete release of each seed from said seed disc and to provide sufficient separation between adjacent released seeds for accurate placement of the seeds in the soil.

11. The seed meter of claim 10, wherein four adjacent resilient fingers are simultaneously engaged by said fixed member to interrupt vacuum communication with four adjacent apertures.

12. The seed meter of claim 11, wherein said fixed member includes four spaced roller bearings adapted to simultaneously and respectively engage four adjacent resilient fingers.

13. The seed meter of claim 1 further comprising a spacer disposed in said vacuum chamber between said seed disc and said finger wheel and adjacent an inner end of each of said resilient fingers for insuring proper spacing between the distal end portions of said resilient fingers and an adjacent surface of said seed disc to allow for application of vacuum to each of said apertures to ensure secure attachment of the seeds to the seed disc.

14. The seed meter of claim 1, wherein said finger wheel includes a generally circular inner hub formed unitarily with said plural resilient fingers, and wherein said resilient fingers extend radially outwardly from said circular inner hub.

15. The seed meter of claim 14 further comprising a means for securely coupling said finger wheel to a center portion of said seed disc.

* * * * *